UNITED STATES PATENT OFFICE.

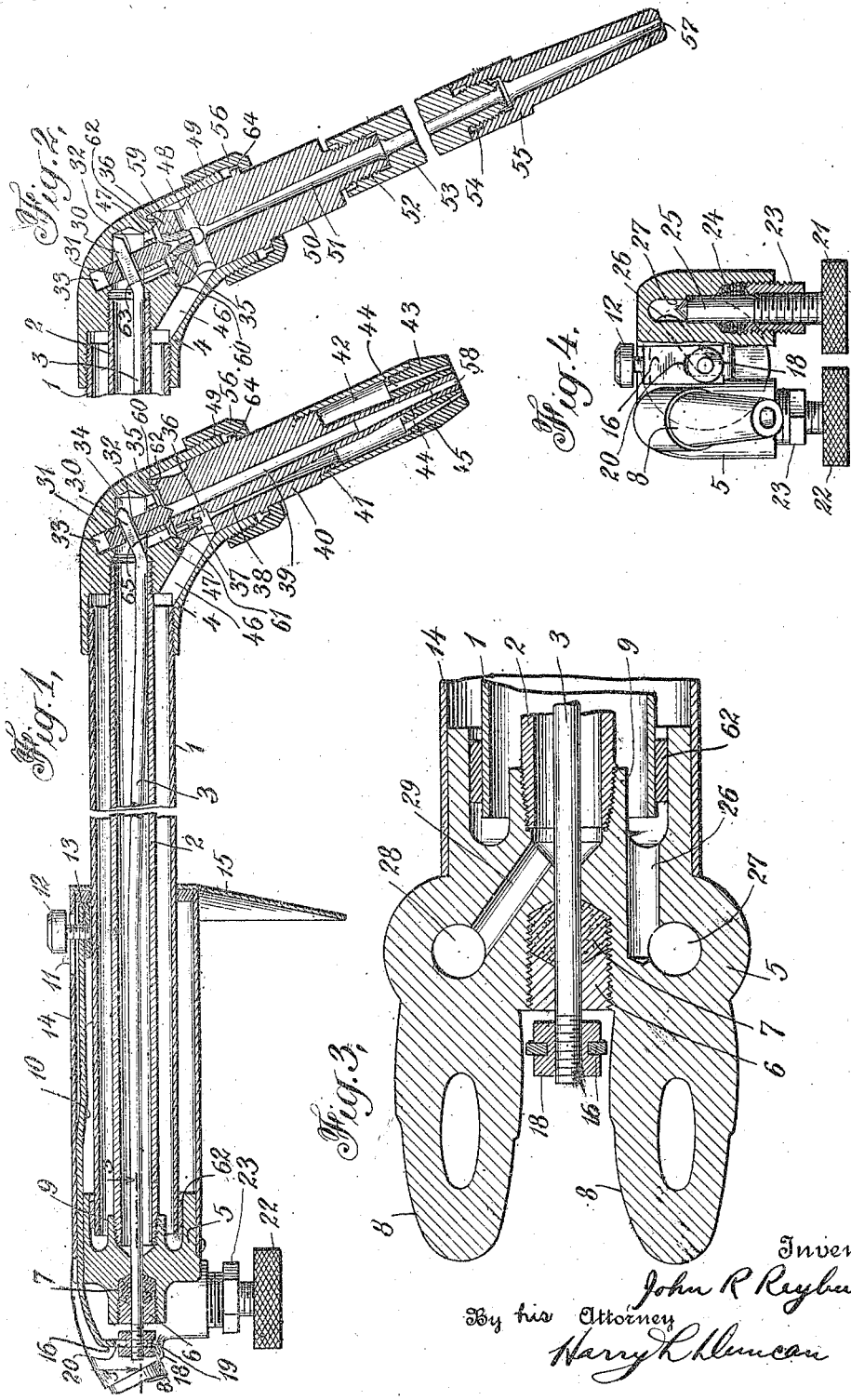

JOHN R. REYBURN, OF FAIRFIELD, CONNECTICUT, ASSIGNOR TO PRATT & CADY COMPANY, INCORPORATED, OF HARTFORD, CONNECTICUT, A CORPORATION OF NEW YORK.

CUTTING OR WELDING BLOWPIPE.

1,266,858.  Specification of Letters Patent.  Patented May 21, 1918.

Application filed December 29, 1915. Serial No. 69,137.

*To all whom it may concern:*

Be it known that I, JOHN R. REYBURN, a citizen of the United States, and resident of Fairfield, Fairfield county, Connecticut, have made a certain new and useful Invention Relating to Cutting or Welding Blowpipes, of which the following is a specification, taken in connection with the accompanying drawing, which forms part of the same.

This invention relates especially to cutting or welding blowpipes adapted for the use of oxy-acetylene gas and in which a special actuating or shut-off valve is arranged independently of the regulating valves on the gas supply connections so as not to interfere with their action while allowing the supply of oxygen for the cutting jet, for instance, to be shut off when desired. The replaceable tips are preferably arranged with metallic joints or packing portions and with a protecting ledge around this joint portion of the tip so as to prevent its distortion by accidentally striking or impact. The tip or coöperating head member is also provided with reduced area junction surfaces which are adapted to be forced strongly into engagement with the coöperating member so as to insure definite and tight contact under the severe conditions under which these devices are used.

In the accompanying drawing showing in a somewhat diagrammatic way an illustrative embodiment of this invention Figure 1 is a longitudinal section through a cutting blowpipe or torch.

Fig. 2 is a similar sectional detail of the head showing a heating or welding tip arranged in connection therewith.

Fig. 3 is a transverse enlarged section taken substantially along the line 3—3 of Fig. 1; and Fig. 4 is a detail showing one of the regulating valves in cross-section.

The blowpipe may be provided with a tubular stem 1 of brass or other suitable metal or material which may be surrounded by an enlarged tubular handle 14 which may also be soldered or joined to the connector member 5 in any suitable way, and the handle may if desired have a metal or other shield 15 secured adjacent its forward portion to more or less protect the hand of the operator. As indicated an internal gas tube 2 may be screwed or otherwise connected to the projection 9 on the connector member so as to conduct one of the gases to the head 4 of the device which as indicated may have threaded connection with this tube and with the stem 1. The connector member may as indicated in somewhat greater detail in Fig. 3 be provided with the two connections 8 with which the oxygen or other supporter of combustion and the acetylene or other heating gas may be connected and two regulating valves of any suitable construction and type may be arranged in this connector member such as the valves 21, 22 which if desired may have threaded engagement with the bushings or glands 23 which serve to hold the packings 24 in position and also to allow the fine adjustment of the conical or other connected valve portions 25 so as to close the passages 27, 28 to the desired extent. As indicated the acetylene passage 27 may communicate through the connecting bore or passage 26 with the annular space between the stem 1 and tube 2 and the oxygen passage 28 may communicate with the bore 29 leading to the inside of this gas tube 2 so that oxygen may thus be conducted to the central bore or chamber 34 in the head. The tips are detachably connected with the head in any suitable way and a suitable cutting tip such as 40 may be secured to the head by being slipped into the opening formed therein and then firmly held in position by screwing up the securing collar 56 on the threaded end 49 of the head so that it engages the flange 64 on the tip. This tip is preferably formed with a metallic packing or joint with the coöperating portion of the head, one of these members being formed with a small area junction surface such as 62 so as to insure tight joint at this point when the parts are forced home to crowd this junction surface against the coöperating surface 61 of the tip which may with advantage be formed flat and recessed within the protecting ledge 60 so that a fall or accidental impact does not mar or destroy the coöperating junction surfaces. It is desirable to shut off the supply of oxygen to the cutting jet in the tip without disarranging the fine adjustment of the regulating valves governing the supply of these gases to the blowpipe. For this purpose a shut-off valve, such as 31, may be mounted in a suitable recess 33 in the head and have its forward portion operate in a suitable guide 65 in the head and be brought into engagement with an axial valve seat or gas passage in the tip and regulate the supply of oxygen to the cutting jet therein. This valve may be readily operated by forming an angular operating slot or inclined socket 32 therein with which the angular end 30 of an actuator rod 3 may coöperate so as to longitudinally move the valve when this rod is moved backward or forward in the handle. This movement may be conveniently effected by bringing this actuator rod out through a suitable stuffing box 6, and packing 7 in the end of the connector member and threading a nut such as 18 on the end of this rod and this nut may be formed with an annular recess 19 with which the yoke or slot 20 in the end 16 of a suitable actuator bar 10 may coöperate. As indicated this bar may be conveniently brought through a hole or guideway in the connector member so that its forward end is located between the handle 14 and stem 1 of the blowpipe and a thumb piece such as 12 may be secured to this actuator bar in any desired way as by a threaded connection between the thumb piece and a doubled or reinforced end 13 of the actuator bar, for instance. In this way the thumb piece which is always in convenient reach of the operator may be moved longitudinally of the slot 11 and thus effect the desired longitudinal movement of the actuator rod and instantly open or close the shut-off valve 31 in case of undesirable ignition in the blowpipe passages.

The cutting tip 40 shown in Fig. 1 may as indicated be formed with an axial cutting passage 39 having a reduced end forming the cutting discharge conduit 58 from which the cutting jet is projected against the work. One or more heating jet discharge conduits 44 may be arranged adjacent this cutting jet within the end 43 of the tip which as indicated may be screwed to the connecting shell 45 having a similar screw joint 41 with the inner end of the tip. In this way an annular heating feed chamber or passage 42 is formed in the tip communicating with each of the inclined heating jet discharge conduits 44 and supplying them with a combustible mixture of gases which may be fed to this chamber in any desired way as through the injector passage 38 communicating with the injector chamber 36 adjacent the inner end of the tip which is in communication with the acetylene passage 46 in the head communicating with the annular passage or conduit between the stem 1 and gas tube 2. The oxygen for these heating jets may be supplied through the injector nozzle 37 in the tip and communicating with the oxygen supply so that this jet of oxygen is directed down the injector passage 38 and mixes with the acetylene or other inflammable gas drawn into the same by this injector action. In this way the cutting jet is substantially surrounded by these inwardly directed heating jets and the metal kept up to ignition temperature in the line of cut.

If desired this cutting tip may be quickly replaced by a welding or heating tip such as shown in Fig. 4. This tip 50 may be provided with a similar flange 64 with which the securing collar 56 coöperates to force its flat junction surface 63 into engagement with the reduced area junction surface 62 on the head and thus make tight joint between these parts. The shut-off valve 31 may as indicated coöperate directly with a valve seat formed in the oxygen nozzle 35 in this tip which may have a nozzle passage 59 formed therein which is directed in line with the injector passage 51 in the tip. In this way acetylene is drawn into the acetylene feed passages 48 in this part of the tip which communicate with the passage 46 through which the acetylene is supplied and mixture of these gases is thus insured before they are delivered from the discharge conduit 57 in the replaceable tip end 55. As indicated this tip end may be provided with a screw thread by which it may be joined with the tip 50 or with an interposed extension member or tip body 53 having the junction thread 54 formed thereon. This tip body may have a similar screw joint 52 with the tip so that one or more of these parts may be renewed or replaced at any time and one or more such extension members mounted on the tip to suit the particular conditions of work.

This invention has been described in connection with a number of illustrative embodiments, forms, arrangements, proportions, parts, materials and devices, to the details of which disclosure the invention is not of course to be limited, since what is claimed as new and what is desired to be secured by Letters Patent is set forth in the appended claims:

1. A cutting or welding blowpipe comprising a tubular stem and a connected head extending at an oblique angle to said stem, and regulating valves to regulate the supply of oxygen and heating gas to said head, a tip normally coöperating with said head and having a central shut off valve seat, a threaded securing collar securing said tip to said head and engaging a projecting flange on said tip, a reduced area metallic junction surface between said head and the end of said tip to form a tight joint therewith, a projecting protecting ledge around the junction surface of said tip, a gas passage communicating with said tip for the admission of oxygen, a shut-off valve mounted in a recess in said head to control said gas passage and formed with an inclined actuating socket, an actuator rod having a bent end in said socket and a connected projecting thumb piece to actuate said shut-off valve.

2. A cutting or welding blowpipe comprising a tubular stem and a connected head extending at an angle to said stem, and regulating valves to regulate the supply of oxygen and heating gas to said head, a tip normally coöperating with said head and having a central shut off valve seat, a securing collar securing said tip to said head and engaging a projecting flange on said tip, a reduced area metallic junction surface between said head and the end of said tip to form a tight joint therewith, a gas passage communicating with said tip, a shut-off valve mounted in a recess in said head to control said gas passage.

3. A cutting or welding blowpipe comprising a head, a reduced area metallic junction surface formed in said head, a replaceable tip having a substantially flat junction surface to be forced into coöperation with said reduced area junction surface and having a projecting protecting ledge around its junction surface, said tip being formed with nozzle passages to form heating or cutting jets and a replaceable tip end removably secured to said tip and having a tip socket to be forced into tight engagement with said tip.

4. A cutting or welding blowpipe comprising a handle and a connected head, a reduced area metallic junction surface formed in said head, a replaceable tip having a substantially flat junction surface to be forced into coöperation with said reduced area junction surface and having a projecting protecting ledge around its junction surface, said tip being formed with nozzle passages to form heating or cutting jets.

5. A cutting or welding blowpipe comprising a head member, a replaceable tip forming another member removably coöperating with said head member, a reduced area metallic junction surface formed on one of said members to be forced into tight contact with the junction surface on the other member, said tip having a projecting protecting ledge around its flat junction surface and being formed with a nozzle passage for heating or cutting jets, and with a centrally located valve seat adjacent said head member and a cut-off valve in said head member coöperating with said valve seat.

6. A cutting or welding blowpipe comprising a head member, a replaceable tip forming another member removably coöperating with said head member, a reduced area metallic junction surface formed on one of said members to be forced into tight contact with the junction surface on the other member, said tip having a projecting protecting ledge adjacent its junction surface and being formed with a nozzle passage for heating or cutting jets.

JOHN R. REYBURN.

Witnesses:
JOHN P. RAMSEY,
WM. C. ETTERSHANK.